Patented Feb. 17, 1925.

1,526,423

UNITED STATES PATENT OFFICE.

FREDERICK G. KEYES, OF CAMBRIDGE, AND CHARLES A. KRAUS, OF WORCESTER, MASSACHUSETTS, ASSIGNORS TO ARTHUR A. NOYES, TRUSTEE, OF PASADENA, CALIFORNIA.

VITREOUS MATERIAL.

No Drawing. Continuation of application Serial No. 752,374, filed March 6, 1913. This application filed October 13, 1920. Serial No. 416,699.

*To all whom it may concern:*

Be it known that we, FREDERICK G. KEYES and CHARLES A. KRAUS, both citizens of the United States of America, residing at, respectively, Cambridge, Middlesex County, Massachusetts, and Worcester, Worcester County, Massachusetts, have invented certain new and useful Improvements in Vitreous Material, of which the following is a full, clear, and exact description.

Our invention consists in a new and useful composition of matter, and its object is the production of a vitreous material combining a low coefficient of expansion with a relatively low melting point and a low electrical conductivity at elevated temperatures.

Heretofore in the manufacture of a vitreous material of very low coefficient of expansion, fused silica has been the only material available. This material, while possessing the valuable property of a low coefficient of expansion, possesses such physical properties at or near its melting point that it is exceedingly difficult to manufacture a flawless product. Furthermore, its melting point lies at such an elevated temperature that it cannot be employed for many purposes where otherwise it would prove very valuable. For example, its melting or softening point lies above the point at which platinum melts and it is therefore impossible to effect a seal between platinum and fused silica.

Attempts have been made to qualify silica by adding to it various other ingredients. In doing this, basic materials have been added, the basic material having either been added in a free state, in which case combination with the free silica results in the mixture, or otherwise, the basic material has been added in combination with an acid material, together forming a neutral salt or compound. The presence of basic material, even in relatively small quantities, imparts to the glass certain properties which it is desirable to avoid. Such glasses, for example, exhibit a relatively high coefficient of expansion with a relatively slight lowering of the melting point. At the same time, the presence of the basic oxide, which is either added in the form of a salt or compound or otherwise forms a salt or compound by combining with silica ($SiO_2$) or other acid constituent, greatly increases the conducting power of the resulting mixture for the electric current. When a material is to be subjected to voltage stress, particularly at elevated temperatures, it is desirable to maintain the insulating power of the material at the highest possible point.

We have found that anhydrous boric acid ($B_2O_3$) may be added to and uniformly and homogeneously mixed with silica to form a stable and useful vitreous product. Such a product has a very low coefficient of expansion, and at the same time, has a melting point sufficiently low to make it possible to carry out with it operations which are impossible with fused silica. A mixture of 20 per cent of boric acid with 80 per cent of silica may be sealed directly to fused silica tubes in a permanent and effective manner. At the same time, the melting point of this glass is sufficiently low to permit of its being sealed to platinum. Owing to the fact that a vitreous material of this composition contains no basic oxide, it possesses a relatively high insulating power under high dielectric strength, particularly at somewhat elevated temperatures.

It will be understood that if desired, small amounts of other oxides than anhydrous boric acid ($B_2O_3$) may be added to silica ($SiO_2$) as for example for coloring the mixture, without departing from our invention. In all cases, however, the mixture should compose a large excess of acid constituents ($SiO_2$ and $B_2O_3$) over basic constituents.

The vitreous composition is made by mixing silica ($SiO_2$) and boric acid ($B_2O_3$) in the form of a fine powder. After thorough mixing, the mixture is heated to a point where the two constituents intermingle and a homogeneous product results. The resulting "melt" may thereafter be worked after the customary manner of working glass, as for example, it may be drawn, blown, and the like, which operations are well understood by those skilled in the art.

The ease with which the resulting glass may be melted depends on the amount of anhydrous boric acid ($B_2O_3$) added. A composition comprising 80 per cent of silica ($SiO_2$) and 20 per cent of anhydrous boric acid ($B_2O_3$) yields a product which we have found particularly useful in making seals for vapor electric apparatus constructed of fused silica. The fluidity or fusibility of the said composition is great enough to permit its being applied to platinum tubes, while its coefficient of expansion is still sufficiently low to permit its being joined directly to fused silica." Such junctions between the said composition and fused silica have been tested by plunging them while red hot into water without impairment of the junction. Such a glass is also useful in the construction of vapor electric apparatus intended to operate at an elevated temperature, since even at a red heat it possesses a high insulating power owing to the absence of basic constituents. Its melting point, moreover, may be made sufficiently high so that it will not give way to mechanical stress at elevated temperatures. As a substitute for fused quartz it possesses many advantages, since it may be worked through a large temperature range. Our invention is not restricted to the particular composition which we have mentioned, this composition having been mentioned for the purpose of illustrating some of the advantages to be gained by a composition of the nature which we suggest. Our invention includes any mixture of the two constituents silica ($SiO_2$) and anhydrous boric acid ($B_2O_3$). Other constituents may be added but not in such quantity as to combine or neutralize completely or in large part the acid constituents ($SiO_2$) and ($B_2O_3$) present.

It is to be understood that in compounding glasses, the same product results whether a basic and an acid constituent be added separately or whether they be added in the same proportions in the combined form.

This application is a continuation of our application Serial No. 752,374, filed March 6, 1913.

By the use of the term "a coefficient of expansion in the neighborhood of that of silica" in the claims we refer to any vitreous material having a coefficient of expansion approximating that of silica, which is practically zero, and less than that of the glasses of the prior art, glasses having such intermediate coefficients being described in our Patent No. 1,014,757, dated January 18, 1912.

What we claim is:

1. A glass having a coefficient of expansion in the neighborhood of that of silica and greater than that of silica.

2. A glass having a coefficient of expansion in the neighborhood of that of silica and being more fusible than silica.

3. A vitreous material composed of silica qualified by boric anhydride.

4. A vitreous material composed of silica and boric anhydride substantially in the proportion of four parts of silica to one part of boric anhydride.

5. A vitreous material comprising the oxides of silicon and boron, the material having a coefficient of expansion in the neighborhood of that of silica.

6. A vitreous material comprising the oxides of silicon and boron, the material having a coefficient of expansion in the neighborhood of that of silica and being more fusible than silica.

In testimony whereof we hereto affix our signatures.

FREDERICK G. KEYES.
CHARLES A. KRAUS.